United States Patent
Mamidwar (10) Patent No.: US 8,213,602 B2
(45) Date of Patent: Jul. 3, 2012

(54) METHOD AND SYSTEM FOR ENCRYPTING AND DECRYPTING A TRANSPORT STREAM USING MULTIPLE ALGORITHMS

(75) Inventor: Rajesh Mamidwar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 789 days.

(21) Appl. No.: 11/606,305

(22) Filed: Nov. 27, 2006

(65) Prior Publication Data

US 2008/0123859 A1     May 29, 2008

(51) Int. Cl.
*H04L 9/28* (2006.01)
*H04L 29/06* (2006.01)
*H04N 7/167* (2011.01)
*H04N 7/16* (2011.01)
*H04K 1/00* (2006.01)
*G06F 12/14* (2006.01)
*G06F 21/00* (2006.01)

(52) U.S. Cl. .......... 380/28; 380/201; 380/210; 380/223; 380/239; 380/255; 713/150; 713/163; 713/165; 713/189; 726/26; 705/50; 705/51; 705/57

(58) Field of Classification Search .................. 380/28, 380/201, 210, 223, 239, 255; 713/150, 163, 713/165, 189; 726/26; 705/50, 51, 57
See application file for complete search history.

(56) References Cited

U.S. PATENT DOCUMENTS

| | | | |
|---|---|---|---|
| 6,199,165 B1 * | 3/2001 | Grunner | 726/3 |
| 2003/0118185 A1 * | 6/2003 | Lambert | 380/263 |
| 2003/0228018 A1 * | 12/2003 | Vince | 380/277 |
| 2005/0169466 A1 * | 8/2005 | Graunke | 380/200 |
| 2006/0188023 A1 * | 8/2006 | Ju | 375/240.22 |
| 2006/0285686 A1 * | 12/2006 | Van Den Heuvel et al. | 380/200 |
| 2007/0112971 A1 * | 5/2007 | Noff et al. | 709/231 |
| 2007/0150731 A1 * | 6/2007 | Ohkoshi et al. | 713/168 |
| 2007/0154018 A1 * | 7/2007 | Watanabe | 380/273 |
| 2008/0025508 A1 * | 1/2008 | Lee | 380/201 |
| 2008/0082824 A1 * | 4/2008 | Ibrahim et al. | 713/171 |

* cited by examiner

*Primary Examiner* — Aravind Moorthy
(74) *Attorney, Agent, or Firm* — Farjami & Farjami LLP (57) ABSTRACT

There is provided a method for encrypting a data stream using multiple algorithms. In one embodiment, a first portion of the data stream is encrypted with a first algorithm utilizing a first key to generate a first encrypted portion. The first algorithm can be, for example, a Triple Data Encryption Algorithm (TDEA). Data indicating the first algorithm and the first key is then transmitted. Then, the first encrypted portion of the data stream is transmitted. Thereafter, a second portion of the data stream is encrypted with a second algorithm utilizing a second key to generate a second encrypted portion. The second algorithm can be, for example, a Single Data Encryption Algorithm (SDEA). Next, data indicating the second algorithm and the second key is transmitted. Thereafter, the first encrypted portion of the data stream is transmitted.

17 Claims, 6 Drawing Sheets

METHOD AND SYSTEM FOR ENCRYPTING AND DECRYPTING A TRANSPORT STREAM USING MULTIPLE ALGORITHMS

BACKGROUND OF THE INVENTION

1. Field of the Invention

The present invention relates generally to the encryption and decryption of data. More particularly, the present invention relates to the encryption and decryption of data streams.

2. Background Art

Today, digital content is typically transmitted from one location to another using a transport stream, such as an MPEG-2 transport stream. Once received, the transport stream can be decoded into suitable audio and video signals, which can be used by an output device to view the content. As such, content providers typically encrypt the transport stream prior to transmission to prevent unauthorized parties, i.e., non-subscribers, from receiving and viewing the content without having paid for it. Consequently, content providers are continuously striving for more impenetrable and highly robust encryption methods for protecting their content.

Figure 1:
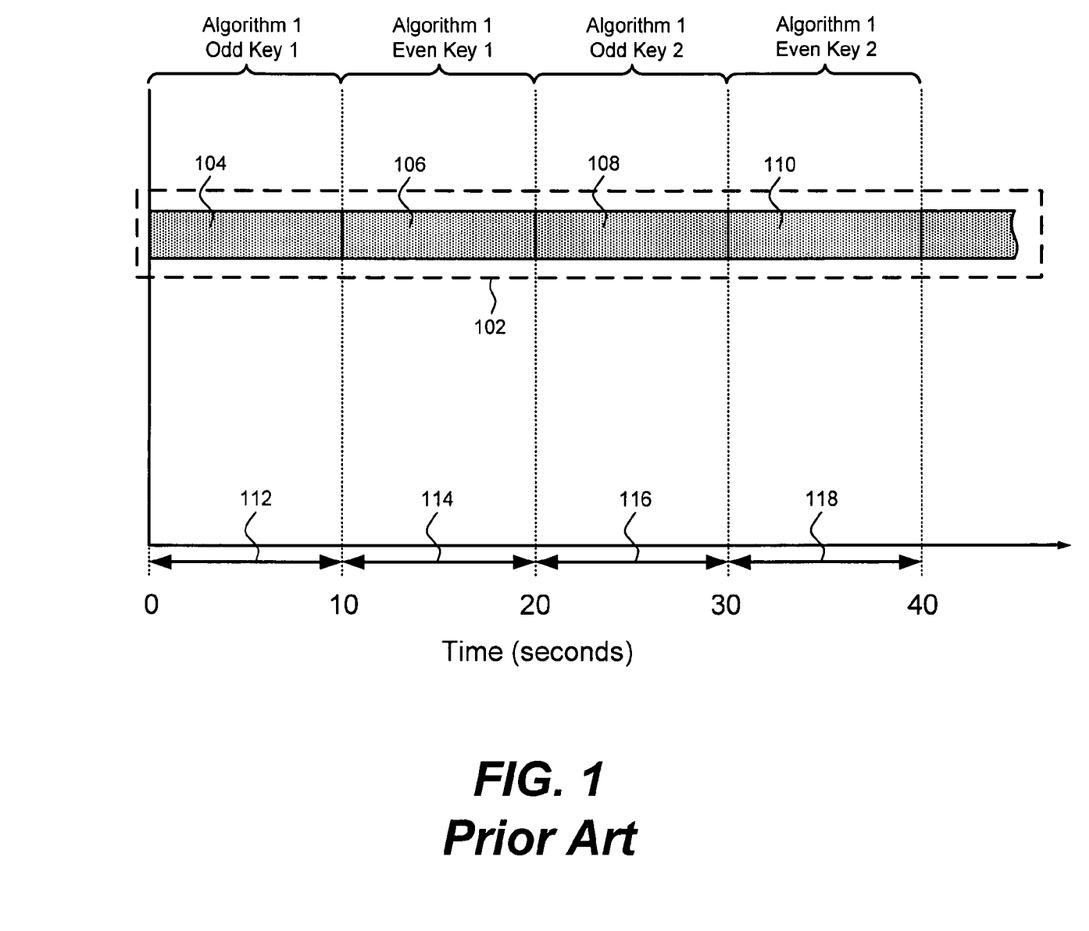
FIG. 1 shows a transport stream that is encrypted using a conventional encryption method.

FIG. 1 shows a transport stream that is encrypted using a conventional encryption method. As shown in FIG. 1, encrypted transport stream 102 has encrypted portions 104, 106, 108, and 110, where each encrypted portion includes a sequence of encrypted transport packets. As also shown in FIG. 1, encrypted portions 104, 106, and 108, and 110, are defined by encryption intervals 112, 114, 116, and 118, respectively. As further shown in FIG. 1, encrypted portion 104 is encrypted with "Algorithm 1" utilizing "Odd Key 1," encrypted portion 106 is encrypted with "Algorithm 1" utilizing "Even Key 1," encrypted portion 108 is encrypted with "Algorithm 1" utilizing "Odd Key 2," and encrypted portion 110 is encrypted with "Algorithm 1" utilizing "Even Key 2." For example, Algorithm 1 can be a Single Data Encryption Algorithm (SDEA), a Triple Data Encryption Algorithm (TDEA), a Common Scrambling Algorithm (CSA) such as that used in the Digital Video Broadcasting (DVB) system, or an Advanced Encryption Standard (AES) Algorithm.

Thus, as shown in FIG. 1, the key e.g., Odd Key 1, is changed every ten seconds, such that each encryption interval e.g., encryption intervals 112, 114, 116, and 118, spans a period of ten seconds. For example, as shown in FIG. 1, Odd Key 1 is used to encrypt the transport stream for the first ten seconds, e.g., during encryption interval 112, while Even Key 1 is used to encrypt the transport stream for the subsequent ten seconds, e.g., during encryption interval 114. By periodically changing the key used by Algorithm 1, the conventional encryption method used to encrypt the transport stream increases the difficulty of unauthorized decryption of the encrypted transport stream. The conventional encryption method used in FIG. 1, however suffers a critical weakness because if the algorithm used to encrypt the transport stream, i.e., Algorithm 1, is hacked by a third party, then the encrypted transport stream can be easily decrypted, thereby allowing the content to be freely viewed.

Thus, there is a strong need in the art for a method and system for encrypting and decrypting a data stream.

SUMMARY OF THE INVENTION

There are provided methods and systems for encrypting and decrypting a data stream using multiple algorithms, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
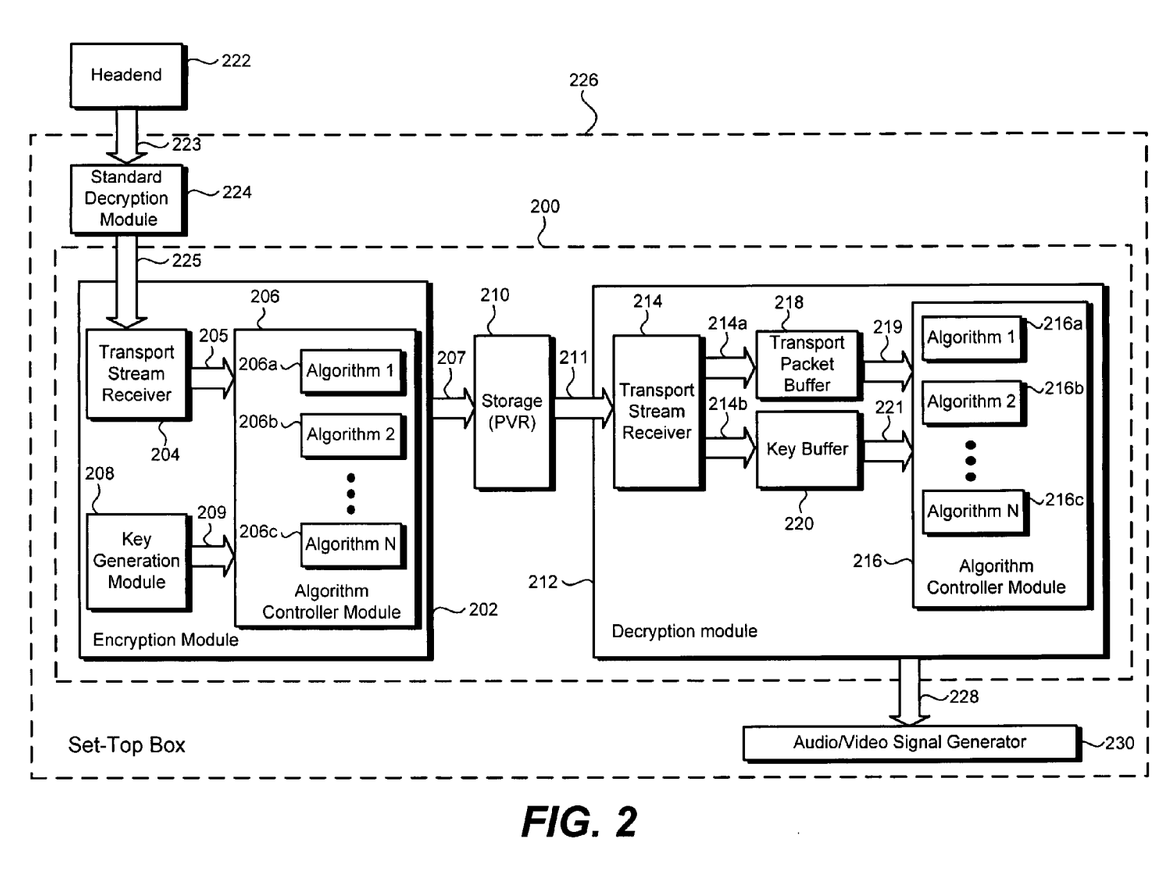
FIG. 2 is a block diagram illustrating a system for encrypting and decrypting a transport stream using multiple encryption algorithms in accordance with one embodiment of the present invention.

FIG. 2 illustrates a system for encrypting and decrypting a transport or data stream using multiple algorithms. As shown in FIG. 2, system 200 includes encryption module 202, decryption module 212, and storage device 210. As shown in FIG. 2, encryption module 202 includes transport stream receiver 204, algorithm controller module 206, and key generation module 208. As also shown in FIG. 2, decryption module 212 includes transport stream receiver 214, transport packet buffer 218, key buffer 220, and algorithm controller module 216. For example, system 200 can be situated in a set-top box, such as set-top box 226.

As shown in FIG. 2, an encrypted transport stream can be transmitted by headend 222 to set-top box 226 via data path 223. The transport stream can be received and decrypted by standard decryption module 224 using decryption methods known in the art. Encryption module 202 in FIG. 2 can be configured to then receive the transport stream in transport stream receiver 204 via data path 225. The transport stream, for example, can be an MPEG-2 transport stream containing a sequence of transport packets, or other types of data, such as audio/video data, Internet data, data to transfer contents to handheld or cell phones, data from set top to TVs. For example, each transport packet in the transport stream can be 188 bytes in length and can include a four-byte header. The header can further include a 13-bit packet identifier (PID) and a 2-bit scrambling control field.

Transport stream receiver 204 can be configured to provide a sequence of transport packets in the transport stream to algorithm controller module 206 via data path 205. Algorithm controller module 206 can be implemented, for example, in hardware or software. As shown in FIG. 2, algorithm controller module 206 can include various algorithms, such as algorithm 206a and algorithm 206b, which can be used to encrypt the transport packets in the transport stream. In other embodiments, algorithm controller module 206 can include additional algorithms. Thus, in the embodiment of the invention shown in FIG. 2, algorithms 206a and 206b represent the first and second algorithms in algorithm controller module 206, respectively, while algorithm 206c represents the nth algorithm. For example, algorithms 206a, 206b, and 206c can each be a Single Data Encryption Algorithm (SDEA), a Triple Data Encryption Algorithm (TDEA), a Common Scrambling Algorithm (CSA) such as that used in the Digital Video Broadcasting (DVB) system, or an Advanced Encryption Standard (AES) Algorithm.

Key generation module 208 can be configured to generate various keys and to provide the keys to algorithm controller module 206 via data path 209. The keys can be used by algorithm 206a, 206b, or 206c to encrypt the transport packets provided to algorithm controller module 206. Key generation module 208 can be implemented in hardware or software using methods known in the art. Moreover, each key generated by key generation module 208 can have an odd or even parity. The parity of the key used to encrypt a transport packet can be indicated in the abovementioned 2-bit scrambling control field included in the header of each transport packet.

Algorithm controller module 206 can be configured to encrypt a sequence of transport packets, e.g., a portion of the transport stream provided by transport stream receiver 204, by receiving a key from key generation module 208 and by using the key with one of the algorithms included in algorithm controller module 206, such as algorithm 206a, to encrypt the sequence of transport packets. Algorithm controller module 206 can be further configured to receive a different key and to use the different key with another algorithm included in algorithm controller module 206, such as algorithm 206b, to encrypt a subsequent sequence of transport packets. Thus, in one embodiment of the invention, algorithm controller module 206 can be configured to change the algorithm used to encrypt a sequence of transport packets each time the key is changed. In such an embodiment, one portion of the transport stream can be encrypted using one type of algorithm, while another portion of the transport stream can be encrypted using a different type of algorithm. In another embodiment, algorithm controller module 206 can be configured to change the algorithm used to encrypt a sequence of transport packets at certain intervals that are independent of when the key is changed.

Figure 3:
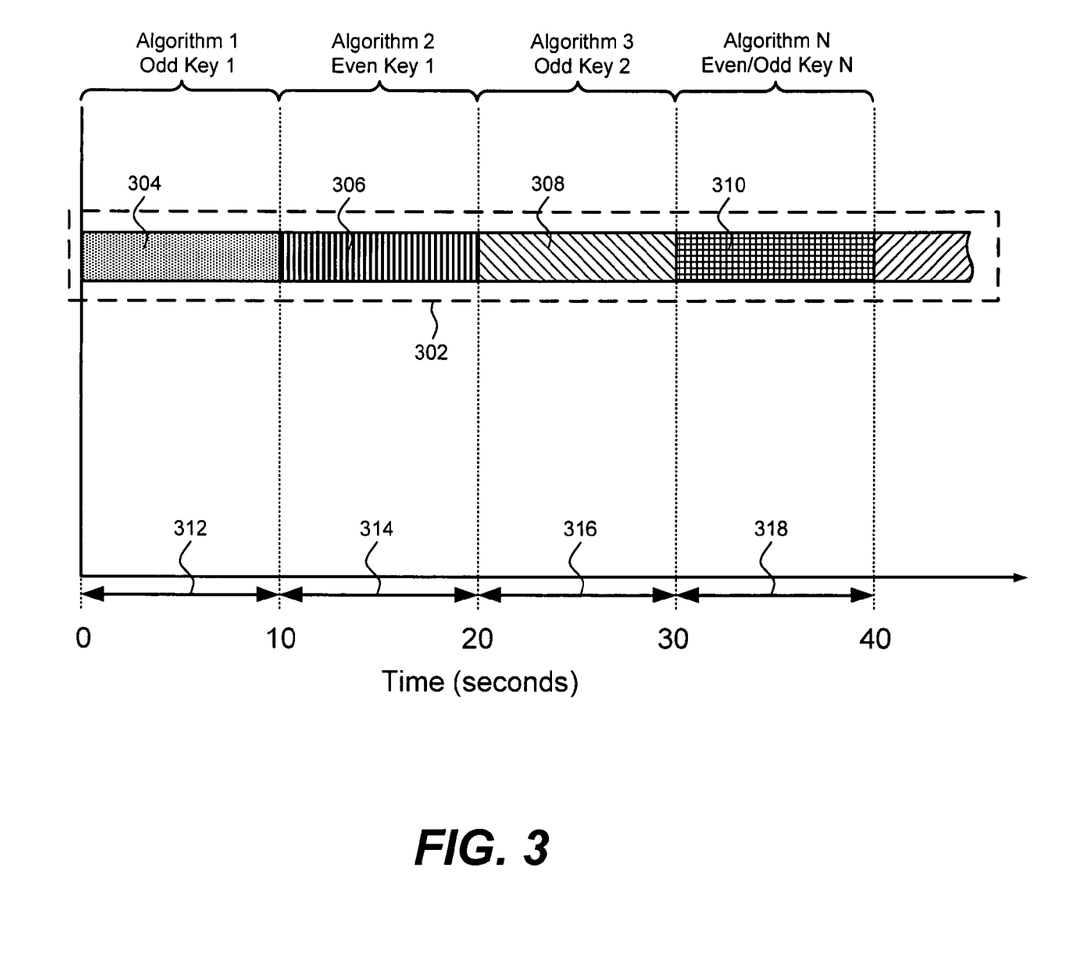
FIG. 3 shows an example encrypted transport stream in accordance with one embodiment of the present invention.

FIG. 3 shows an example encrypted transport stream in accordance with one embodiment of the present invention. As shown in FIG. 3, encrypted transport stream 302 has encrypted portions 304, 306, 308, and 310, where each encrypted portion includes a sequence of encrypted transport packets. As also shown in FIG. 3, encrypted portions 304, 306, 308, and 310 are defined by encryption intervals 312, 314, 316, and 318, respectively. As further shown in FIG. 3, encrypted portion 304 is encrypted with "Algorithm 1" utilizing "Odd Key 1," encrypted portion 306 is encrypted with "Algorithm 2" utilizing "Even Key 1," and encrypted portion 308 is encrypted with "Algorithm 3" utilizing "Odd Key 2." Encrypted portion 310, for example, is encrypted with "Algorithm N," which can represent an nth algorithm, and utilizing "Even/Odd Key N," which can represent an even or odd nth key. In particular, Algorithm 1, Algorithm 2, and Algorithm N in FIG. 3 correspond to algorithm 206a, algorithm 206b, and algorithm 206c in FIG. 2, respectively.

Thus, as shown in FIG. 3, the encryption key e.g., Odd Key 1, can be changed at desired time periods as the transport stream is encrypted by encryption module 202. In FIG. 3, for example, the encryption key is changed every ten seconds, such that each encryption interval e.g., encryption intervals 312, 314, 316, and 318, spans a period of ten seconds. For example, as shown in FIG. 3, Odd Key 1 is used to encrypt the transport stream for the first ten seconds, e.g., during encryption interval 312, while Even Key 1 is used to encrypt the transport stream for the subsequent ten seconds, e.g., during encryption interval 314. As further shown in FIG. 3, the algorithm used to encrypt the transport stream is also changed each time the encryption key is changed. In another embodiment, the algorithm used to encrypt a sequence of transport packets may be changed at certain intervals that are independent of when the key is changed. For example, Algorithm 1 is used to encrypt the transport stream when the key used is Odd Key 1, and Algorithm 2 is used to encrypt the transport stream when the key used is Even Key 1. Although the key in FIG. 3 is changed every ten seconds, the encryption key in other embodiments may be changed at various time periods without departing from the scope of the invention. As such, the encryption intervals of the invention can vary in relation to other encryption intervals and thus are not required to be equal as suggested in FIG. 3.

Referring now to FIG. 2, encryption module 202 can be further configured to generate at least one key packet which can contain, for example, the key and other information, such as information indicating the algorithm used to encrypt a transport packet. For example, the key packet can be 188 bytes in length and can include a four-byte header, which can further include a 13-bit packet identifier (PID). In one embodiment, the key packet can contain one or more customized bits, which can indicate the algorithm used to encrypt a transport packet.

Once a sequence of transport packets has been encrypted by encryption module 202, the sequence of encrypted transport packets can be transmitted to storage device 210 along with a key packet, via data path 207. For example, storage device 210 can be a hard disk such as that used in a Personal Video Recorder (PVR). In a preferred embodiment, the key packet is transmitted before the sequence of encrypted transport packets. In one embodiment, for example, the key packet is transmitted through a separate channel of the encrypted transport stream by using a PID value which varies from the PID values of the encrypted transport packets. Since the parity of the key used to encrypt a transport packet can be indicated in the abovementioned 2-bit scrambling control field included in the header of each transport packet, the appropriate key can later be determined by matching the parity indicated in the 2-bit scrambling control field to the parity of the key included in a transport packet.

Storage device 210 in FIG. 2 can be configured to transmit the encrypted transport stream to decryption module 212 via data path 211 for decryption. As shown in FIG. 2, decryption module 212 can receive the encrypted transport stream in transport stream receiver 214. For example, transport stream receiver 214 can be configured to demultiplex the encrypted transport stream by analyzing the PID values included in the headers of the encrypted transport packets and the key packets. As also shown in FIG. 2, the key packets in the encrypted transport stream can be provided to key buffer 220 via data path 214b and the encrypted transport packets in the encrypted transport stream can be provided to transport packet buffer 218 via data path 214a. In one embodiment of the invention, key buffer 220 may be configured to temporarily store both odd and even parities of a key, e.g., Odd Key 1 and Even Key 1. As shown in FIG. 2, algorithm controller module 216 can receive encrypted transport packets from transport packet buffer 218 via data path 219 and can also receive keys from key buffer 220 via data path 221.

As shown in FIG. 2, algorithm controller module 216 can include various algorithms, such as algorithm 216a and algorithm 216b, which can be used to decrypt the encrypted transport packets in the encrypted transport stream. In other embodiments, algorithm controller module 216 can include additional algorithms. Thus, in the embodiment of the invention shown in FIG. 2, algorithms 216a and 216b represent the first and second algorithms in algorithm controller module 216, respectively, while algorithm 216c represents the nth algorithm. In particular, algorithms 216a, 216b, and 216c correspond to algorithms 206a, 206b, and 206c in algorithm controller module 206. It should be noted that algorithm controller modules 206 and 216 can be implemented in hardware or software, and also they can be included a single configurable module to handle both functions.

In one embodiment of the invention, each time a key packet is received by key buffer 220, key buffer 220 can transmit the key and the data indicating the algorithm that was used to encrypt a sequence of transport packets to algorithm controller module 216. For example, a key packet might contain a key having an odd parity such as Odd Key 1, and data indicating Algorithm 1. Algorithm controller module 216 can then receive an encrypted transport packet and determine the parity of the key used to encrypt the encrypted transport packet by analyzing its scrambling control bits. Thus, in this particular example, if the parity of the key used to encrypt an encrypted transport packet is determined to be odd, then algorithm controller module 216 would decrypt the encrypted transport packet with algorithm 216a, i.e., Algorithm 1, using Odd Key 1. Likewise, algorithm controller module 216 might subsequently receive a key packet containing a key having an even parity, such as Even Key 1, and data indicating Algorithm 2. In this case, algorithm controller module 216 may determine the parity of a subsequently received encrypted transport packet, and if determined to be even, algorithm controller module 216 may proceed to decrypt the encrypted transport packet with algorithm 216b, i.e., Algorithm 2, using Even Key 1. The decrypted transport packets, i.e., the decrypted transport stream, can be provided to audio/video signal generator 230 via data path 228, which can be configured to decode the decrypted transport stream and to provide suitable audio and video signals to one or more output devices, such as a television, using methods known in the art.

Figure 4:
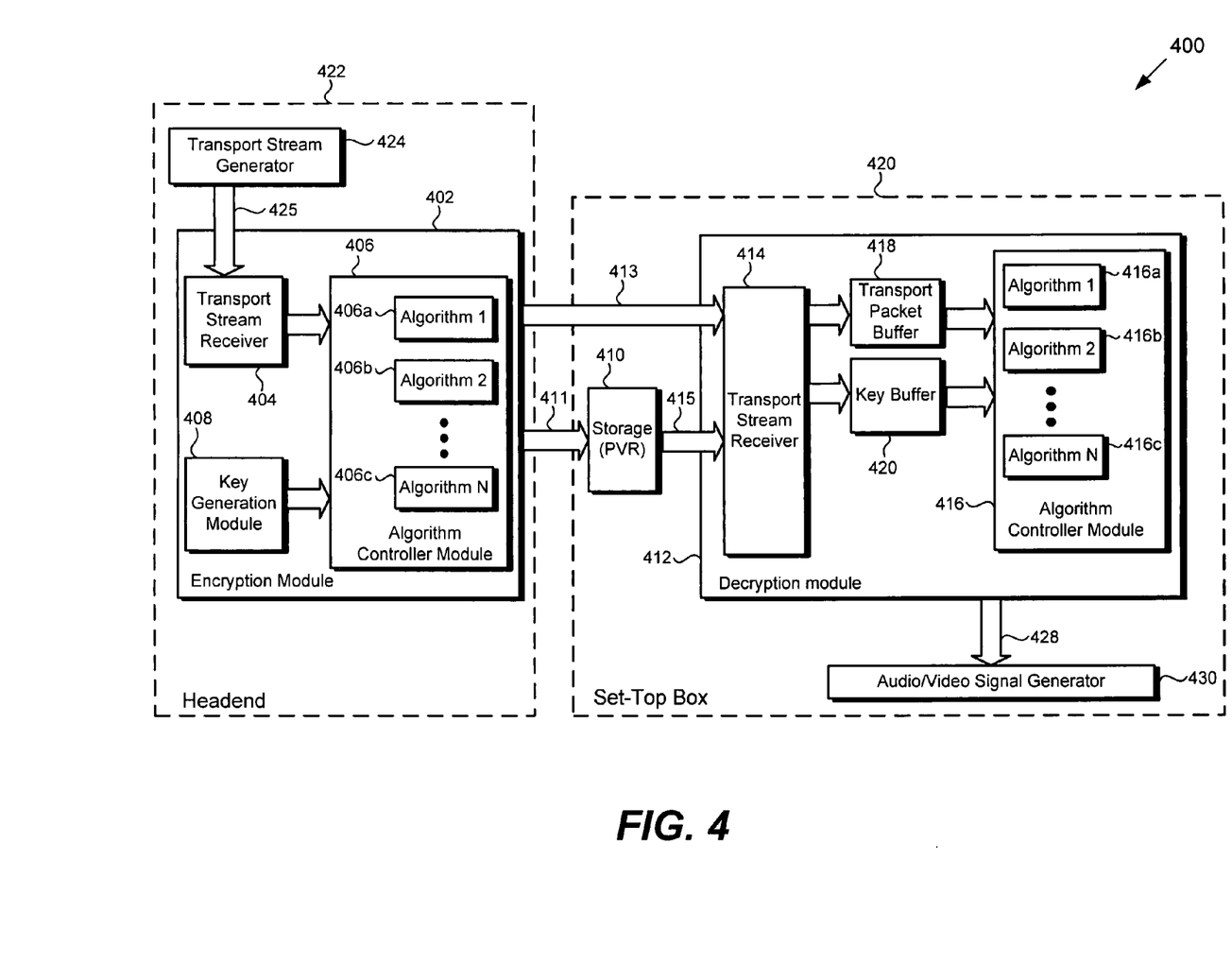
FIG. 4 is a block diagram illustrating a system for encrypting and decrypting a transport stream using multiple encryption algorithms in accordance with one embodiment of the present invention.

FIG. 4 illustrates a system for encrypting and decrypting a transport stream using multiple encryption algorithms in accordance with one embodiment of the invention. As shown in FIG. 4, system 400 includes encryption module 402, decryption module 412, and storage device 410, which correspond to encryption module 202, decryption module 212, and storage device 210 in FIG. 2, respectively. As also shown in FIG. 4, encryption module 402 includes transport stream receiver 404, algorithm controller module 406, and key generation module 408, which respectively correspond to transport stream receiver 204, algorithm controller module 206, and key generation module 208 in FIG. 2.

As shown in FIG. 4, algorithm controller module 406 can include various algorithms, such as algorithm 406a, algorithm 406b, and algorithm 406c, which correspond to algorithm 206a, algorithm 206b, and algorithm 206c in FIG. 2, respectively. Decryption module 412 in FIG. 4 includes transport stream receiver 414, transport packet buffer 418, key buffer 420, and algorithm controller module 416, which correspond to transport stream receiver 214, transport packet buffer 218, key buffer 220, and algorithm controller module 216 in FIG. 2, respectively. As also shown in FIG. 4, algorithm controller module 416 can include various algorithms, such as algorithm 416a, algorithm 416b, and algorithm 416c, which correspond to algorithm 216a, algorithm 216b, and algorithm 216c in FIG. 2, respectively. As further shown in FIG. 4, for example, encryption module 402 can be situated at a headend, such as headend 422, while decryption module 412 and storage device 410 can be situated in a set-top box, such as set-top box 420.

As shown in FIG. 4, encryption module 402 in FIG. 4 can receive a transport stream provided by transport stream generator 424 via data path 425. Transport stream generator 424 can be an MPEG-2 encoding device, for example, and the transport stream can be an MPEG-2 transport stream containing a sequence of transport packets. Encryption module 402 can be configured to receive the transport stream in transport stream receiver 404, and can be configured to encrypt the transport stream with different algorithms and keys in a manner similar to encryption module 202 discussed above. Moreover, encryption module 402 can be configured to generate key packets and can transmit the key packets along with the encrypted transport stream to set-top box 420 via data paths 411 and 413. For example, data paths 411 and 413 can each be a physical connection, such as a cable, or a wireless communication link, such as a satellite communication link. Data paths 411 and 413 can each carry MPEG-2 transport data, or other types of data, such as audio/video data, Internet data, data to transfer contents to handheld or cell phones, data from set top to TVs.

As shown in FIG. 4, the encrypted transport stream can be received by storage device 410 via data path 411 and by decryption module 412 via data path 413. Thus, in the embodiment of the invention shown in FIG. 4, the encrypted transport stream can be stored in storage device 410 and can be accessed by decryption module 412 via data path 415 at a later time. Thus, decryption module 412 can receive the encrypted transport stream at transport stream receiver 414 and can decrypt the encrypted transport stream in a manner similar to decryption module 212 discussed above to generate a decrypted transport stream. The decrypted transport stream can be provided to audio/video signal generator 430 via data path 428, which can be configured to decode the decrypted transport stream and to provide suitable audio and video signals to one or more output devices, such as a television, using methods known in the art.

Thus, the embodiment of the invention shown in FIG. 4 allows a service provider at headend 422 to transmit a highly robust encrypted transport stream to a set-top box where various portions of the transport stream are encrypted with various algorithms and keys. In contrast, encrypted transport streams generated by conventional encryption methods using only a single algorithm are substantially more vulnerable for unauthorized decryption, since the entire encrypted transport stream can be easily decrypted if the single algorithm is hacked by a third party. Moreover, since the invention allows the service provider to control the algorithms used to encrypt the transport stream, e.g., algorithms 406a and 406b, the service provider can disable algorithms suspected of being hacked or can change the sequence of algorithms used to encrypt the transport stream to effectively preserve the robustness of the encrypted transport stream.

Figure 5A:
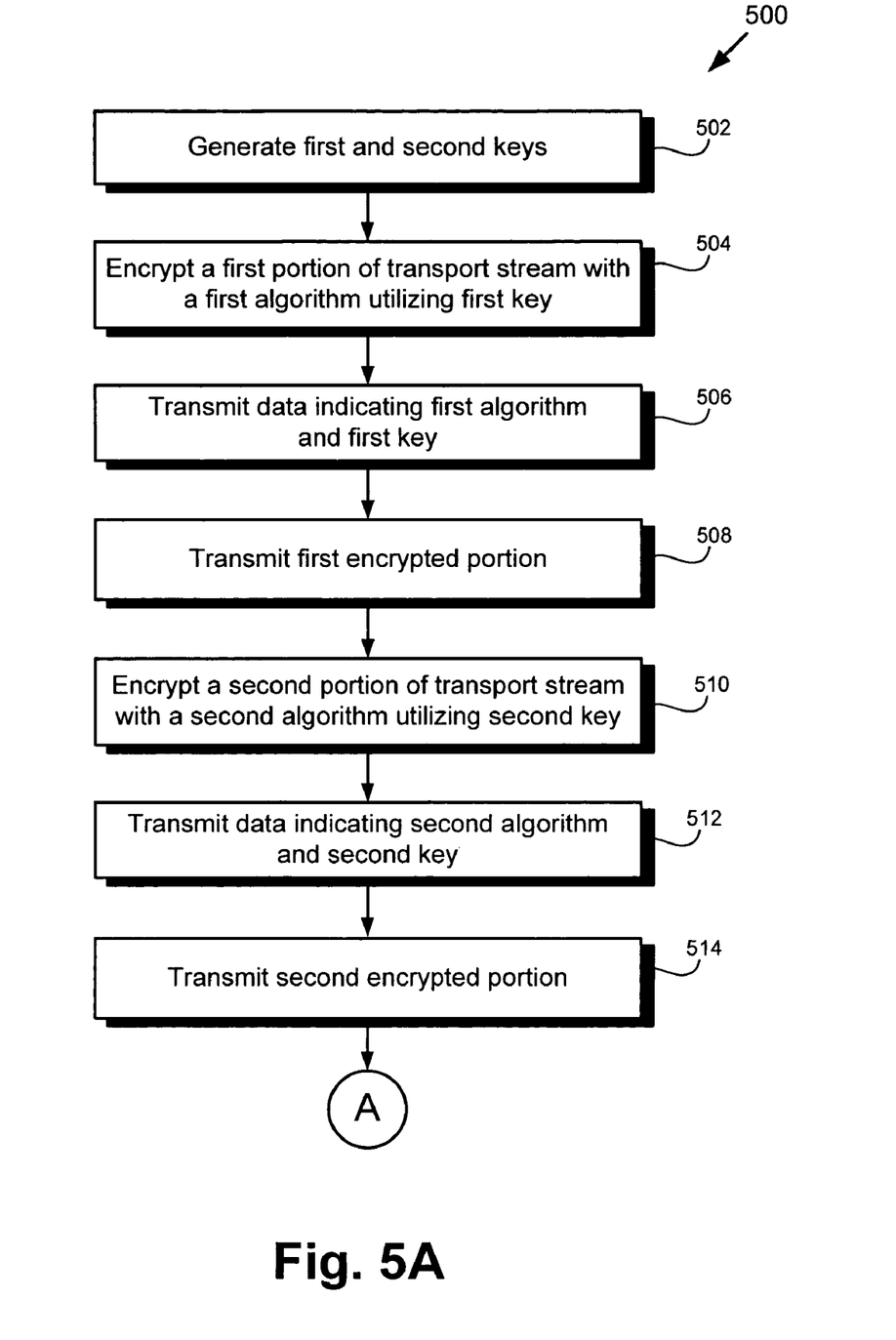
FIGS. 5A and 5B illustrate a flow diagram of a method for encrypting and decrypting a transport stream in accordance with one embodiment of the present invention.
Figure 5B:
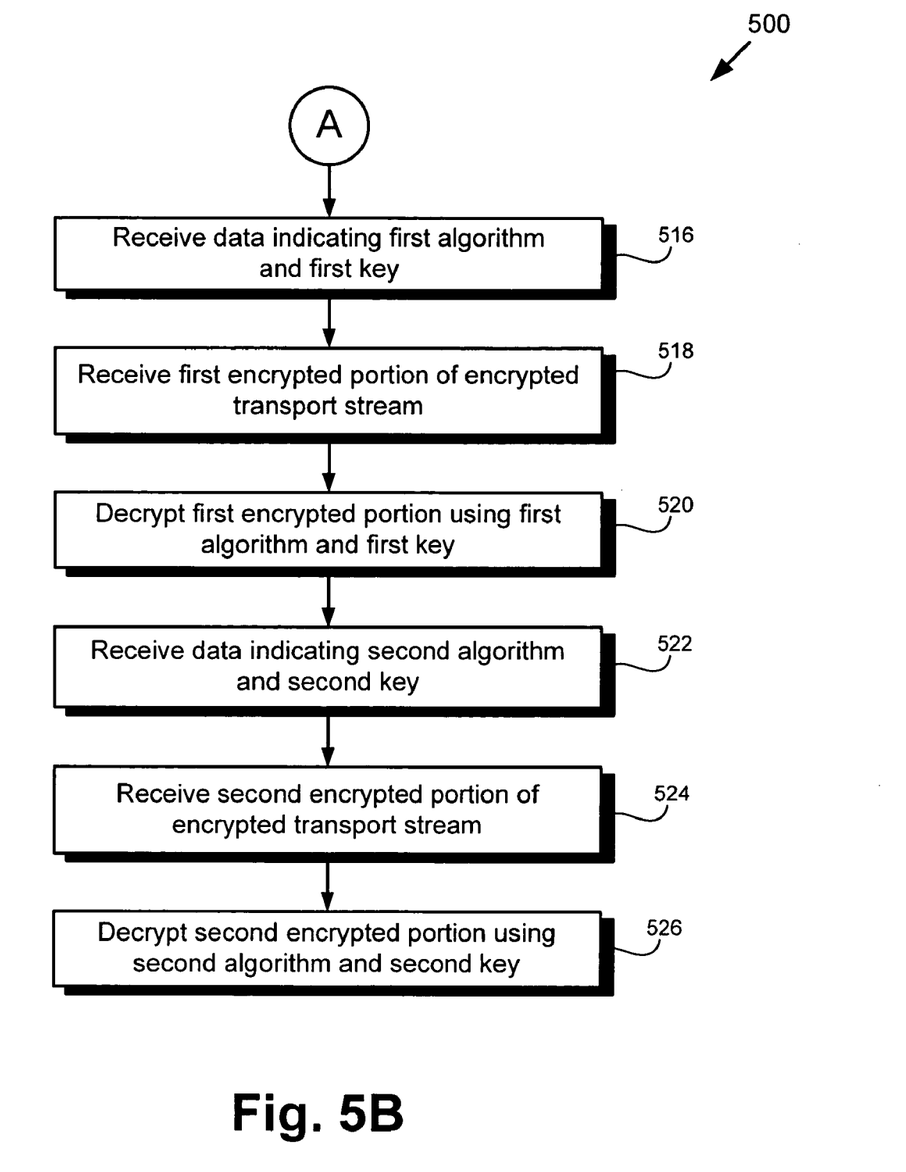

FIGS. 5A and 5B illustrate flowchart 500 for performing an example method for encrypting and decrypting a transport stream in accordance with one embodiment of the present invention. As shown in FIG. 5A, at step 502 of flowchart 500, first and second keys are generated. At step 504, a first portion of a transport stream is encrypted with a first algorithm using the first key. The first algorithm can be, for example, a Single Data Encryption Algorithm (SDEA), a Triple Data Encryption Algorithm (TDEA), a Common Scrambling Algorithm (CSA), or an Advanced Encryption Standard (AES) Algorithm. At step 506, data indicating the first algorithm and the first key are transmitted through a first channel on the transport stream. Thereafter, at step 508, the first encrypted portion is transmitted through a second channel on the transport stream. At step 510, a second portion of the transport stream is encrypted with a second algorithm using the second key. The second algorithm can be, for example, a Single Data Encryption Algorithm (SDEA), a Triple Data Encryption Algorithm (TDEA), a Common Scrambling Algorithm (CSA), or an Advanced Encryption Standard (AES) Algorithm. At step 512, data indicating the second algorithm and the second key are transmitted through the first channel on the transport stream. Thereafter, at step 514, the second encrypted portion is transmitted through the second channel.

As shown in FIG. 5B, at step 516 of flowchart 500, decryption of the first and second encrypted portions of the transport stream begins when data indicating the first algorithm and the first key are received. At step 518, the first encrypted portion of the transport stream is received. Thereafter, at step 520, the first encrypted portion is decrypted using the first algorithm and the first key. At step 522, data indicating the second algorithm and the second key are received. At step 524, the second encrypted portion of the transport stream is received. Thereafter, at step 526, the second encrypted portion is decrypted using the second algorithm and the second key.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for encrypting a data stream including a video content, said method comprising:

encrypting a first portion of said video content of said data stream with a first encryption algorithm utilizing a first key to generate a first encrypted portion, wherein said first portion is defined by a first pre-determined period of time and spans for said first pre-determined period of time;

transmitting data indicating said first encryption algorithm and said first key;

transmitting said first encrypted portion;

changing said first encryption algorithm to a second encryption algorithm after said first pre-determined period of time;

encrypting a second portion of said video content of said data stream with said second encryption algorithm utilizing said first key to generate a second encrypted portion, wherein said second portion is defined by a second pre-determined period of time and spans for said second pre-determined period of time;

transmitting data indicating said second encryption algorithm;

transmitting said second encrypted portion;

changing said first key to a second key;

encrypting a third portion of said video content of said data stream with said second encryption algorithm utilizing said second key to generate a third encrypted portion, wherein said third portion is defined by a third pre-determined period of time and spans for said third pre-determined period of time;

transmitting data indicating said second key;

transmitting said third encrypted portion.

2. The method of claim 1 wherein said first, second and third encrypted portions comprise respective first, second and third pluralities of encrypted transport packets, wherein a first parity of said first key is included in each of said first and second plurality of encrypted transport packets, and a second parity of said second key is included in each of said third plurality of encrypted transport packets.

3. The method of claim 1 wherein each of said first pre-determined period of time and said second pre-determined period of time is ten seconds.

4. The method of claim 1 wherein said first and second encryption algorithms is each one of a Single Data Encryption Algorithm (SDEA), a Triple Data Encryption Algorithm (TDEA), a Common Scrambling Algorithm (CSA), or an Advanced Encryption Standard (AES) Algorithm.

5. The method of claim 1 wherein said data indicating said first encryption algorithm and said first key, said data indicating said second encryption algorithm and said data indicating said second key are transmitted through a different channel than said first, second and third encrypted portions.

6. The method of claim 1 wherein said data indicating said first encryption algorithm and said first key is included in a first key packet.

7. A method for decrypting an encrypted video content of a data stream, said method comprising:

receiving data indicating a first encryption algorithm and a first key;

receiving a first encrypted portion of said encrypted video content of said data stream, wherein said first encrypted portion is defined by a first pre-determined period of time and spans for said first pre-determined period of time;

decrypting said first encrypted portion using said first encryption algorithm and said first key;

receiving data indicating a second encryption algorithm after said first pre-determined period of time;

receiving a second encrypted portion of said encrypted video content of said data stream, wherein said second encrypted portion is defined by a second pre-determined period of time and spans for said second pre-determined period of time;

decrypting said second encrypted portion using said second encryption algorithm and said first key;

receiving data indicating a second key;

receiving a third encrypted portion of said encrypted video content of said data stream, wherein said third encrypted portion is defined by a third pre-determined period of time and spans for said third pre-determined period of time;

decrypting said third encrypted portion using said second encryption algorithm and said second key.

8. The method of claim 7 wherein said first, second and third encrypted portions comprise respective first, second and third pluralities of encrypted transport packets, wherein a first parity of said first key is included in each of said first and second plurality of encrypted transport packets, and a second parity of said second key is included in each of said third plurality of encrypted transport packets.

9. The method of claim 7 wherein each of said first pre-determined period of tune and said second pre-determined period of time is ten seconds.

10. The method of claim 7 wherein said first and second encryption algorithms is each one of a Single Data Encryption Algorithm (SDEA), a Triple Data Encryption Algorithm (TDEA), a Common Scrambling Algorithm (CSA), or an Advanced Encryption Standard (AES) Algorithm.

11. The method of claim 7 wherein said data indicating said first encryption algorithm and said first key, said data indicating said second encryption algorithm and said data indicating said second key are received through a different channel than said first, second and third encrypted portions.

12. The method of claim 7 wherein said data indicating said first encryption algorithm and said first key is included in a first key packet.

13. An encryption device including both hardware and software for encrypting a data stream including a video content, said device comprising:

a data stream receiver for receiving said data stream;

a key generation module for generating first and second keys;

an encryption algorithm controller module comprising a first encryption algorithm, a second encryption algorithm and a third encryption algorithm;

wherein said encryption algorithm controller module is configured to:

encrypt a first portion of said encrypted video content of said data stream with said first encryption algorithm utilizing said first key to generate a first encrypted portion, wherein said first portion is defined by a first pre-determined period of time and spans for said first pre-determined period of time;

transmit said first encrypted portion to a storage device for storing said first encrypted portion;

change said first encryption algorithm to said second encryption algorithm after said first pre-determined period of time;

encrypt a second portion of said encrypted video content of said data stream with said second encryption algorithm utilizing said first key to generate a second encrypted portion, wherein said second portion is defined by a second pre-determined period of time and spans for said second pre-determined period of time;

transmit said second encrypted portion to said storage device for storing said second encrypted portion;

encrypt a third portion of said video content of said data stream with said third encryption algorithm utilizing said second key to generate a third encrypted portion, wherein said third portion is defined by a third pre-determined period of time and spans for said third pre-determined period of time;

transmit said third encrypted portion to said storage device for storing said third encrypted portion.

14. The device of claim 13 wherein each of said first pre-determined period of time and said second pre-determined period of time is ten seconds.

15. The device of claim 13 wherein said first and second encryption algorithms is each one of a Single Data Encryption Algorithm (SDEA), a Triple Data Encryption Algorithm (TDEA), a Common Scrambling Algorithm (CSA), or an Advanced Encryption Standard (AES) Algorithm.

16. The device of claim 13 wherein said encryption device is configured to generate data indicating said first encryption algorithm, said first key, said second encryption algorithm, said second key and said third encryption algorithm.

17. The device of claim 13 wherein said data indicating said first encryption algorithm and said first key is transmitted in a first key packet and said data indicating said second encryption algorithm and said second key is transmitted in a second key packet.

* * * * *

UNITED STATES PATENT AND TRADEMARK OFFICE
CERTIFICATE OF CORRECTION

| | |
|---|---|
| PATENT NO. | : 8,213,602 B2 |
| APPLICATION NO. | : 11/606305 |
| DATED | : July 3, 2012 |
| INVENTOR(S) | : Rajesh Mamidwar |

Page 1 of 1

It is certified that error appears in the above-identified patent and that said Letters Patent is hereby corrected as shown below:

In the claims, column 9, line 14, "tune" should be changed to --time--.

Signed and Sealed this
Twenty-fifth Day of September, 2012

David J. Kappos
*Director of the United States Patent and Trademark Office*